Figure 1:
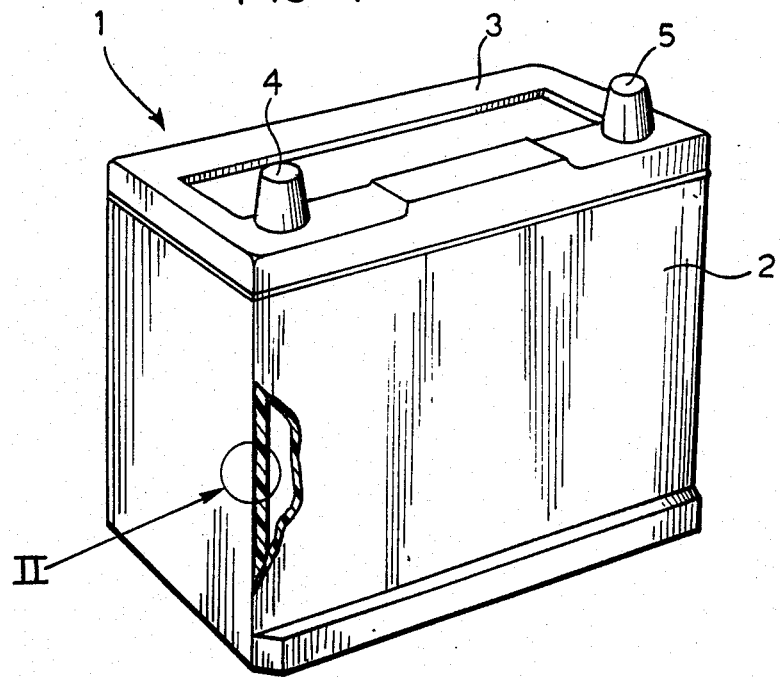

United States Patent [19]

Clerici

[11] Patent Number: 4,830,937
[45] Date of Patent: May 16, 1989

[54] ELECTRICAL ACCUMULATORS AND BATTERIES OF ACCUMULATORS PROVIDED WITH COVERINGS WHICH REFLECT INFRA-RED RADIATION

[75] Inventor: Guido Clerici, Milan, Italy

[73] Assignee: Industrie Magneti Marelli S.r.l., Milan, Italy

[21] Appl. No.: 160,931

[22] Filed: Feb. 26, 1988

[30] Foreign Application Priority Data

Jun. 12, 1987 [IT] Italy ............................... 53415/87[U]

[51] Int. Cl.$^4$ ...................... H01M 2/02; H01M 10/50
[52] U.S. Cl. .................................... 429/120; 429/163; 220/444; 220/450
[58] Field of Search ................ 429/120, 163; 220/444, 220/450, 454

[56] References Cited

U.S. PATENT DOCUMENTS

| | | | |
|---|---|---|---|
| 2,647,653 | 8/1953 | Dube | 220/450 |
| 2,666,091 | 1/1954 | Martin et al. | 429/120 |
| 3,408,234 | 10/1968 | Ririe | 429/163 |
| 3,410,443 | 11/1968 | Hofmann | 220/450 |
| 3,837,918 | 9/1974 | Nakabayashi | 429/120 |
| 4,235,956 | 11/1980 | Gross et al. | 429/120 |
| 4,383,013 | 5/1983 | Bindin et al. | 429/120 |
| 4,669,632 | 6/1987 | Kawasaki et al. | 220/444 |

Primary Examiner—Donald L. Walton
Attorney, Agent, or Firm—Sughrue, Mion, Zinn, Macpeak, and Seas

[57] ABSTRACT

An electrical accumulator has an electrically-insulating container with a covering which reflects infra-red radiation.

2 Claims, 2 Drawing Sheets

ELECTRICAL ACCUMULATORS AND BATTERIES OF ACCUMULATORS PROVIDED WITH COVERINGS WHICH REFLECT INFRA-RED RADIATION

The present invention relates to electrical accumulators.

As is known, electrical accumulators are frequently used in environments where there are hot bodies (such as internal combustion engines, electrical and electronic equipment) that emit heat which, on reaching the accumulator, contributes to the increase in temperatuee of its electrochemical accumulation system.

Generally, the electrochemical accumulation system of an accumulator has an upper temperature limit above which permanent damage to the active materials may occur and/or there may be an appreciable increase in anode corrosion of the rheophores, that is, of the electrical conduction and support grids, and in water consumption.

In particular, accumulators in which the aqueous electrolyte is present in limited quantities have a low thermal capacity, and this may shorten their useful life. Accumulators with nickel-based sintered plates, gas-recombination lead accumulators, and even various types of motor vehicle starter batteries in versions with a good starting ability, that is, provided with numerous thin electrodes separated by thin insulating membranes, belong to this category.

The object of the present invention is to produce an electrical accumulator or a battery of accumulators, in which the electrochemical energy-accumulation system is adequately thermally insulated from its surroundings in use.

This object is achieved by means of an electrical accumulator or battery of accumulators including, in known manner, a container or receptacle which, according to the main characteristic of the present invention, has a covering which reflects infra-red radiation.

According to the invention, this container is preferably made from a closed-cell cellular plastics material and the covering may be constituted by a layer of varnish, by surface metallisation carried out under vacuum, or even by a reflective film, for example, a film of metallised polyethylene terephthalate.

According to a further characteristic of the invention, the thermal insulation achieved may be further improved by providing the container or receptacle of the accumulator or battery with a further outer screening covering adapted to reflect infra-red radiation. This covering may be constituted by a further reflective film, or by a rigid casing adapted to enclose within it the container or receptacle of the accumulator or battery. In this case, the casing is preferably made from a closed-cell cellular plastics material and is conveniently coated internally and externally with a material which reflects infra-red radiation.

Figure 2:
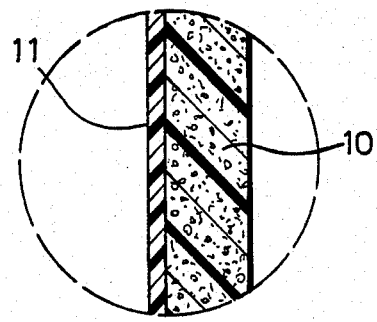
Figure 3:
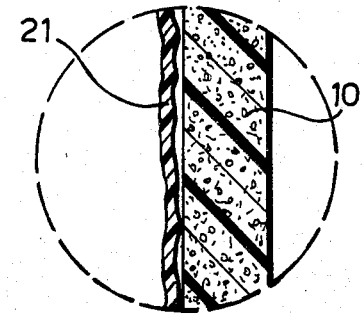
Figure 4:
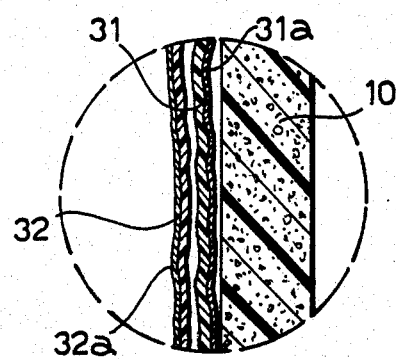
Figure 5:
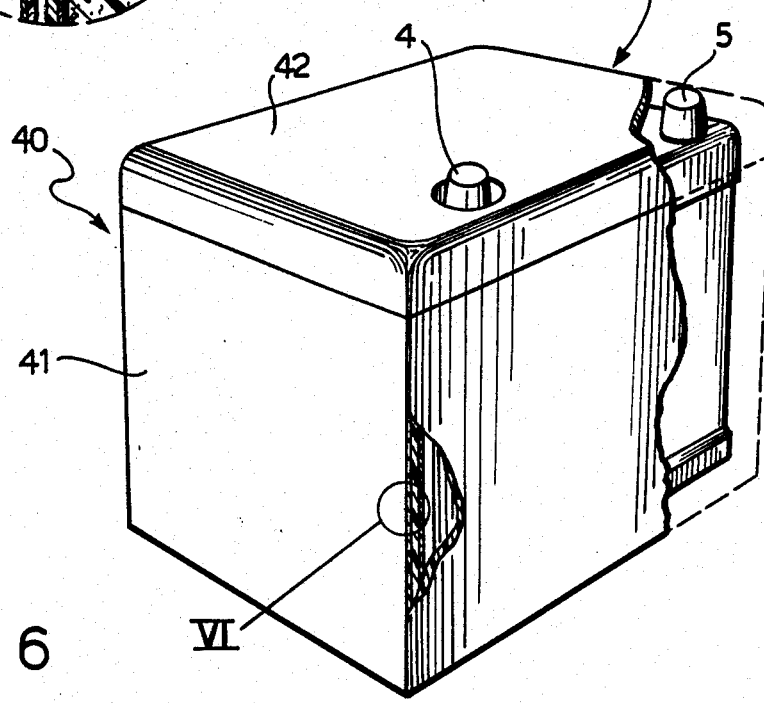
Figure 6:
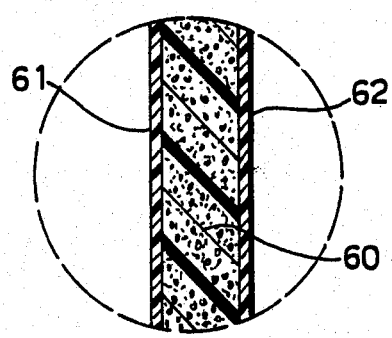

Further characteristics and advantages of the present invention will become clear from the detailed description which follows with reference to the appended drawings, provided purely by way of non-limiting example, in which:

FIG. 1 is a perspective view of a battery of electrical accumulators,

FIGS. 2 to 4 are cross-sections of the wall of the receptacle of a battery of electrical accumulators produced according to the present invention, on an enlarged scale, FIG. 5 is a perspective view of a battery according to the invention, provided with a rigid outer casing adapted to reflect infra-red radiation, and FIG. 6 is a cross-section which shows the wall of the casing of the battery of FIG. 5, on an enlarged scale.

With reference to FIG. 1, a battery of electrical accumulators is generally indicated 1 and is provided with a container of electrically insulating material which is impermeable to the electrolyte, chemically resistant to the action of sulphuric acid, and has adequate mechanical strength. This container comprises a substantially parallelepipedal, tank-like receptacle 2 provided at the top with a lid 3 through which the terminals 4 and 5 of the battery extend.

According to the present invention, the receptacle 2 and the lid 3 are preferably made from a closed-cell cellular plastics mateiial provided externally with a covering which reflects infra-red radiation.

A possible structure of the wall of the receptacle 2 is illustrated in FIG. 2, in which a detail of FIG. 1 is shown. The wall of the lid 3 also has a similar structure.

As is clear from FIG. 2, the wall of the receptacle 2 comprises a main wall portion (or actual wall) 10 made, for example, from closed-cell expanded polythene or polypropylene, to the outer face of which is applied a covering 11 which reflects infra-red radiation. This covering may be constituted by a layer of varnish, by metallisation carried out under vacuum, or even by a film of plastics material, for example, metallised polyethylene terephthalate of a type known commercially as Mylar.

FIG. 3 shows another embodieent of the wall of the container of the battery 1. In this variant, a film 21 is applied to the wall portion 10 and closely surrounds it without adhering intimately to its surface. In this case, the covering forms a sort of shell which closely surrounds the receptacle. This shell may be welded to the wall 10 of the receptacle at the edges of the top opening of the receptacle, and possibly also in other regions, in order to limit the possibility of relative movement of the covering and the risk of its being torn.

The embodiment of FIG. 3 enables a good degree of thermal insulation to be obtained, due both to the insulating characteristics of the wall 10 itself and the reflective action of the film 21, and to the interspace defined between them.

Clearly, the structure shown in FIG. 3 can also be used for the lid 3.

FIG. 4 shows another embodiment of the wall of the battery container. In this embodiment, two films of flexible material 31 and 32 are associated with the wall portion (or actual wall) 10 and surround the outer surface of the container externally (without intimate adherence). The film 31 preferably has surface metallisation 31a on the surface facing the wall 10, while the film 32 has metallisation 32a on the outwardly-facing surface. This wall structure, which may obviously also be used for the lid 3, enables optimum insulation of the battery, by virtue also of the interspaces defined between the films 31 and 32 and between these films and the wall 10.

FIG. 5 shows an embodiment in which the battery 1 is of completely conventional type and is provided with a rigid outer casing 40 formed by a tank-like element 41 to which a lid 42 is fitted at the top. The latter is provided with apertures through which the terminals 4 and 5 of the battery are accessible. The outer casing 40 is conveniently made, according to the present invention, from a closed-cell cellular plastics material, with a wall which can assume the structures described above with reference to FIGS. 2 to 4 or, as shown in FIG. 6, can include a wall portion (or actual wall) 60 which is provided on its surfaces with respective layers 61 and 62 of a material which reflects infra-red radiation. These layers may be constituted by a varnish, by metallisation carried out under vacuum, or even by a film constituted once again, for example, by metallised polyethylene terephthalate.

The invention enables the achievement of an optimum degree of thermal insulation of an accumulator or a battery from its surroundings in use, avoiding both excessive heating and excessive cooling thereof.

Naturally, the invention extends to all embodiments which achieve equal utility by virtue of the same innovative concepts.

I claim:

1. A container for at least one electrical accumulator, said container being comprised of a substantially parallelepipedal, tank-like receptacle having an open top and a lid for closing the top of the receptacle, said receptacle and said lid being constructed from wall panels of closed-cell cellular plastics material and at least one covering for reflecting infrared radiation surrounding said container and secured thereto in a manner defining an interspace between said covering and said wall panels.

2. A container as set forth in claim 1, further comprising an additional covering for reflecting infrared radiation surrounding said container and secured thereto in overlying spaced relation to said at least one covering, wherein said at least one covering is provided with means to reflect infrared radiation towards the container and the additional covering is provided with means to reflect infrared radiation outwardly.

* * * * *